(12) United States Patent
Mangum et al.

(10) Patent No.: US 10,691,176 B2
(45) Date of Patent: Jun. 23, 2020

(54) TEXTURED PATTERN SURFACE FOR A COMPUTING DEVICE

(71) Applicant: Google LLC, Mountain View, CA (US)

(72) Inventors: Robert Mangum, Mountain View, CA (US); Ji Hye Bae, Mountain View, CA (US); Peter Cazalet, Los Gatos, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/033,998

(22) Filed: Jul. 12, 2018

(65) Prior Publication Data
US 2020/0019214 A1    Jan. 16, 2020

(51) Int. Cl.
*G06F 1/16* (2006.01)

(52) U.S. Cl.
CPC ............ *G06F 1/166* (2013.01); *G06F 1/1656* (2013.01); *G06F 1/1667* (2013.01); *G06F 1/1616* (2013.01)

(58) Field of Classification Search
CPC ................................ G06F 1/166; G06F 1/1667
See application file for complete search history.

(56) References Cited

U.S. PATENT DOCUMENTS

| | | | |
|---|---|---|---|
| 5,265,720 A * | 11/1993 | Meliconi | H01H 9/0242 150/165 |
| 6,036,287 A * | 3/2000 | Kim | G06F 1/1616 312/223.2 |
| 6,098,952 A * | 8/2000 | Tonn | A47B 23/043 248/455 |
| 6,179,122 B1 * | 1/2001 | Moncrief | G06F 1/1628 206/320 |
| 8,374,378 B2 | 2/2013 | Hopkinson et al. | |
| 8,531,836 B2 * | 9/2013 | Iwamoto | H05K 5/0234 248/677 |
| 8,531,837 B2 * | 9/2013 | Lee | G06F 1/166 174/138 E |
| 8,941,990 B2 * | 1/2015 | Uttermann | H05K 5/0234 248/188.8 |

(Continued)

FOREIGN PATENT DOCUMENTS

CN    107505995 A    12/2017

OTHER PUBLICATIONS

International Search Report and Written Opinion for Application No. PCT/US2019/041393, dated Oct. 14, 2019, 16 pages.

*Primary Examiner* — Nidhi Thaker
(74) *Attorney, Agent, or Firm* — Brake Hughes Bellermann LLP

(57) ABSTRACT

Example implementations relate to a display portion including a display and a base portion rotatably attached to the display portion. The base portion may include a first cover portion, at least one fastener, a second cover portion attached to the first cover portion by the at least one fastener, the second cover portion including a textured pattern on a surface of the second cover portion, the textured pattern extending in a direction along a longitudinal line, the textured pattern including alternating concave ridges and convex channels, and at least one foot pad member disposed on at least one concave ridge of the textured pattern, the at least one foot pad member extending in the direction along the longitudinal line, the at least one foot pad member being configured to cover at least a portion of the at least one fastener.

16 Claims, 15 Drawing Sheets

(56) References Cited

U.S. PATENT DOCUMENTS

| | | | |
|---|---|---|---|
| 9,084,350 B2* | 7/2015 | Ho | H05K 5/0234 |
| 9,210,242 B2 | 12/2015 | Hobson et al. | |
| 9,377,174 B2 | 6/2016 | Watanabe | |
| 9,913,517 B2* | 3/2018 | Poon | A45C 11/00 |
| 2004/0025993 A1* | 2/2004 | Russell | F16M 11/22 |
| | | | 150/154 |
| 2007/0188987 A1 | 8/2007 | Skillman | |
| 2011/0228457 A1* | 9/2011 | Moon | G06F 1/1626 |
| | | | 361/679.01 |
| 2015/0146373 A1* | 5/2015 | Deng | G06F 1/166 |
| | | | 361/679.59 |

* cited by examiner

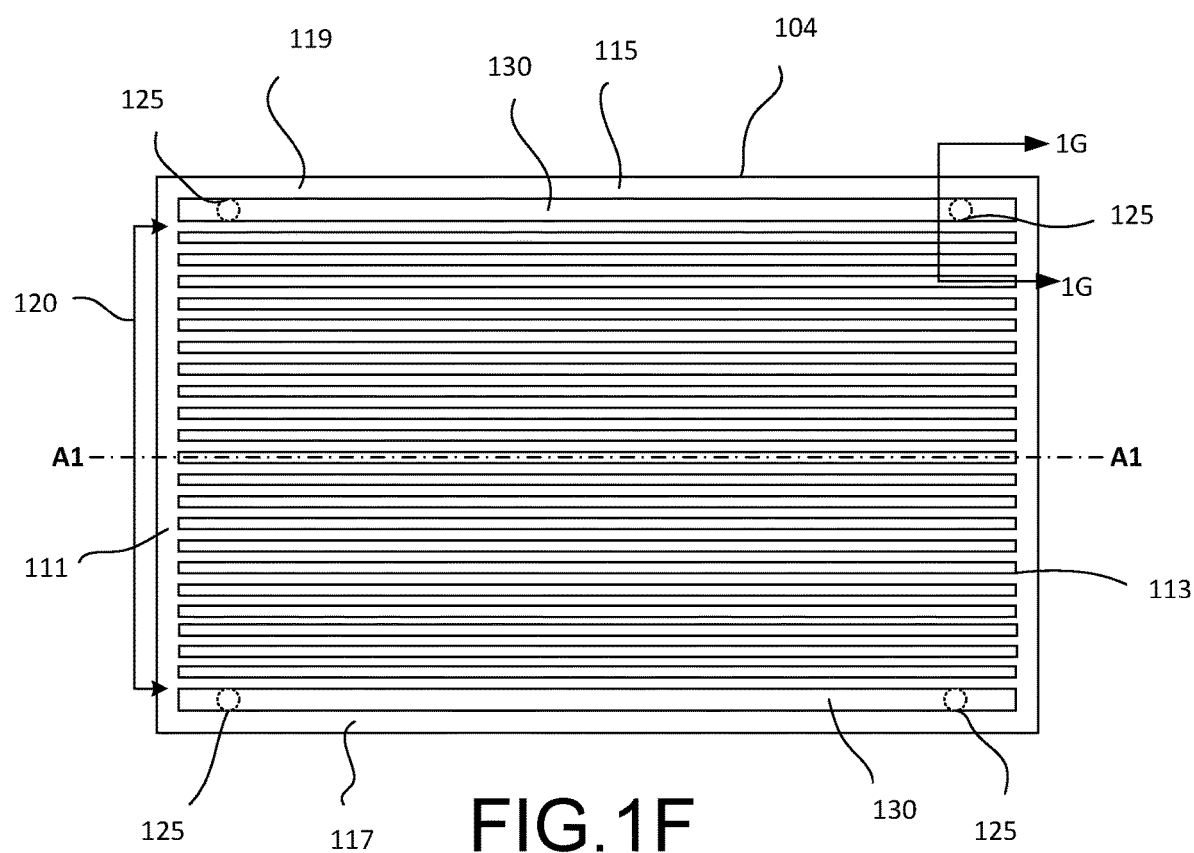

TEXTURED PATTERN SURFACE FOR A COMPUTING DEVICE

TECHNICAL FIELD

This disclosure relates generally to a computing device, and, more particularly, to a computing device having a textured pattern surface.

BACKGROUND

Portable computing devices may include a display portion and a base portion attached to the display portion. Each outer surface of the display portion and the base portion are smooth (e.g., planar, flat, non-textured surface, etc.) such that a user cannot distinguish between a top and a bottom of the computing device. Thus, a need exists for systems and apparatus to address the shortfalls of present technology and to provide other new and innovative features.

SUMMARY

In a general aspect, a display portion including a display and a base portion rotatably attached to the display portion. The base portion may include a first cover portion, at least one fastener, a second cover portion attached to the first cover portion by the at least one fastener, the second cover portion including a textured pattern on a surface of the second cover portion, the textured pattern extending in a direction along a longitudinal line, the textured pattern including alternating concave ridges and convex channels, and at least one foot pad member disposed on at least one concave ridge of the textured pattern, the at least one foot pad member extending in the direction along the longitudinal line, the at least one foot pad member being configured to cover at least a portion of the at least one fastener.

In another general aspect, a portable computing device may include a display, a first cover portion having a first curved sidewall portion, and a second cover portion having a second curved sidewall portion. The second curved sidewall portion may be aligned with the first curved sidewall portion to form a continuous sidewall. The second cover portion may include a textured pattern on a surface of the second cover portion. The textured pattern may include alternating concave ridges and convex channels. The at least one of the concave ridge or the convex channel may form the sidewall.

In another general aspect, a portable computing device may include a base portion including a first cover portion having a first surface and a second surface, opposite the first surface, and a second cover portion having a first surface and a second surface, opposite the first surface. The first surface of the second cover portion may be attached to the second surface of the first cover portion. The second surface of the second cover portion may include a textured pattern. The textured pattern may include alternating concave ridges and convex channels, a distance between the first surface of the second cover portion and a bottom surface of one concave ridge defining a first depth, the second cover portion including at least one foot pad member disposed on the second surface of the second cover portion, a distance between the first surface of the second cover and a bottom surface of the at least one foot pad member defining a second depth, the second depth being greater than the first depth.

BRIEF DESCRIPTION OF THE DRAWINGS

The details of one or more implementations are set forth in the accompanying drawings and the description below. Other features will be apparent from the description and drawings, and from the claims.

FIGS. 1A through 1J are various views of a portable computing device, in accordance with implementations described herein.

DETAILED DESCRIPTION

In the implementations described herein, one of the surfaces of an exemplary computing device may include a textured pattern. The computing devices described herein may include a display portion including a display and a base portion including a keyboard, in which the base portion is attached to the display portion. In some implementations, the computing devices described herein may be a tablet type computing device. In some implementations, the textured pattern may be disposed on an outer, bottom surface of the base portion to distinguish between the display portion and the base portion of the computing device. This provides an indication which side of the portable computing device is up (e.g., top side) and which side is down (e.g., bottom side), without having to open the display portion. In addition, the textured pattern surface provides enhanced gripping of the portable computing device in a closed position or an open position. Furthermore, the textured pattern surface provides structural integrity of the portable computing device.

The devices described herein can have advantages over, for example, conventional devices where surfaces, particularly an outer surface, of the display portion and the base portion are smooth (e.g., planar, flat, non-textured surface, etc.). The surfaces of the display portion and base portion are the same, in a closed position, such that a user cannot determine whether the user is holding the portable computing device in an appropriate manner (e.g., display portion on a top configuration) for an open position.

Figure 1A:
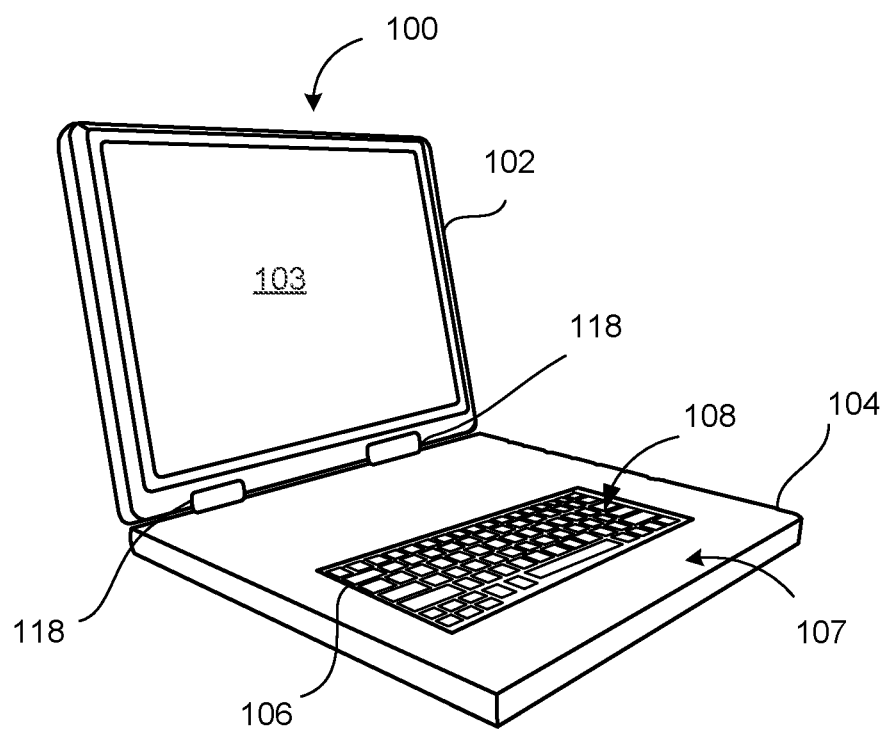

FIG. 1A is a perspective view of a portable computing device 100 according to an example implementation. The portable computing device 100 may include a laptop computer or notebook computer. The portable computing device 100 may also include a tablet computer or other type of computing device, such as, for example, a cellular phone, a media player, mobile device, or other handheld or portable electronic devices. Other configurations may be used for the computing device 100 if desired. The example of FIG. 1A is merely illustrative.

The portable computing device 100 may include a display portion 102. The display portion 102 may include a display 103 on a front side 110 (labeled in FIG. 1B) of the display portion 102. The display 103 may present and/or display graphical output to a user. In an example in which the display 103 is a touchscreen, the display 103 may also receive input from the user, such as tactile input when the user contacts the display 103 with one or more fingers. In some implementations, the portable computing device 100 may be a tablet computer, which does not include the display portion 102.

The portable computing device 100 may include a base portion 104. In some implementations, a surface, particular, an outer surface, of the base portion 104 may include a textured pattern, which will be described further in detail. The base portion 104 may be rotatably attached to the display portion 102, and/or the display portion 102 may be rotatably attached to the base portion 104 via a hinge 118. The rotatable attachment of the display portion 102 to the base portion 104, and/or the base portion 104 to the display portion 102, may enable the display portion 102 to rotate from an open position, shown in FIGS. 1A and 1B, to a closed position, in which the display portion 102 may contact the base portion 104, closing an exposure of a physical keyboard 108 disposed on the base portion 104, as shown in FIG. 1C.

In some implementations, the display 103 can include a touch screen interface and it may be possible to disable the physical keyboard 108 in the base portion 104 and use touch screen interface to provide input to the computing device 100. Such devices, which can be known as convertible devices, can be operated in different modes, in which a plane (e.g., a surface) of the base portion 104 and a plane (e.g., a surface) of the display portion 102 are arranged oriented differently relative to each other. For example, when the plane of the display portion 102 and the plane of the base portion 104 are not parallel to each other, the computing device 100 may be operated in a "laptop mode" in which the physical keyboard 108 of the base portion 104 is enabled to receive user input, and when the plane of the display portion 102 and the plane of the base portion 104 are parallel to, or close to parallel to, each other, the computing device 100 may be operated in a "tablet mode" in which the physical keyboard 108 of the base portion 104 is disabled from receiving human input.

In some convertible devices, the base portion 104 and the display portion 102 can be coupled to each other by the hinge 118, and the display portion 102 can be rotated about the hinge 118 relative to the base portion 104 by 360 degrees, or at least close to 360 degrees. In such a case, the computing device 100 may be operated in a tablet mode when the display portion 102 is rotated relative to the base portion 104. For example, the computing device 100 may have a 360 degrees range of rotation from a closed position to a tablet position.

In some convertible devices, the base portion 104 and the display portion 102 can be detachably coupled to each other (e.g., by one or more mechanisms that hold the display portion 102 relative to the base portion 104 in a laptop mode orientation and that hold the display portion 102 relative to the base portion 104 in a tablet mode orientation). For example, the display portion 102 may be snap-fit coupled to the base portion 104 in laptop mode orientation, and then detached from the base portion 104 and again snap-fit coupled to the base portion 104, but in a tablet mode orientation.

The base portion 104 may include a housing 107. The housing 107 may enclose components of the portable computing device 100, such as a processor, memory, bus, and other components described in greater detail with respect to FIG. 5.

The housing 107 may include an opening 106 in a top side of the base portion 104 to house the keyboard 108 in the opening 106. The opening 106 may allow the keyboard 108 to extend above and/or below the top side of the base portion 104, and to couple with components inside the base portion 104.

Figure 1B:
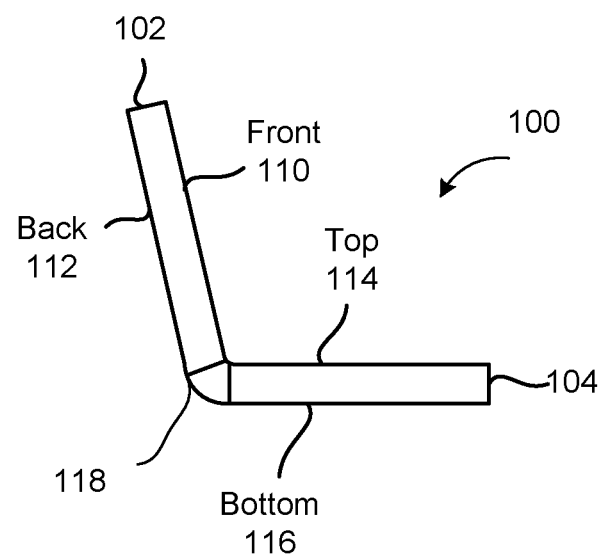
Figure 1C:
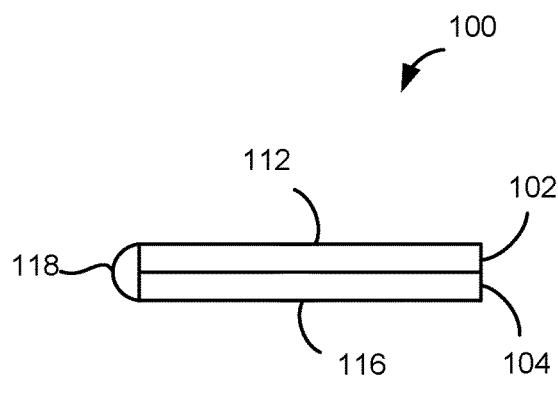

FIG. 1B is a side view of the portable computing device 100 in the open position according to an example embodiment. As shown in FIG. 1B, the display portion 102 may be rotated away from the base portion 104, such as at an angle of between forty-five degrees (45°) and three hundred fifteen degrees (315°) away from the base portion 104. The display portion 102 may include a front side 110 that includes the display 103 (not shown in FIG. 1B), and a back side 112 that is opposite from the front side 110. The base portion 104 may include a top side 114, which includes the keyboard 108 (not shown in FIG. 1B), and a bottom side 116 that is opposite from the top side 114. When the portable computing device 100 is used in the open position, the bottom side 116 of the base portion 104 of the portable computing device 100 may rest on a flat surface, such as a surface of a table or desk.

FIG. 1C is a side view of the portable computing device 100 in a closed position according to an example embodiment. As shown in FIG. 1C, when the portable computing device 100 is in the closed position, the front side 110 (not labeled in FIG. 1C) of the display portion 102, which is opposite from the back side 112, faces and/or is in contact with the top side 114 (not labeled in FIG. 1C) of the base portion 104, which is opposite from the bottom side 116.

Figure 1D:
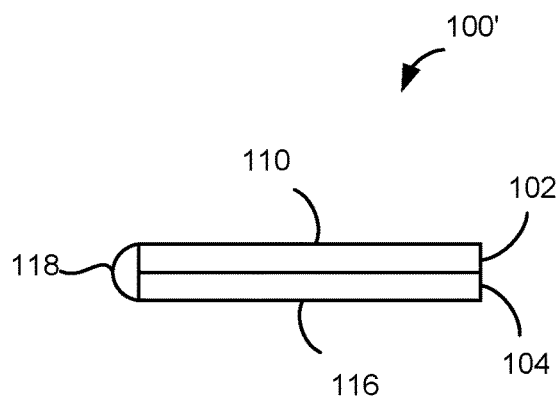

FIG. 1D is a side view of a portable computing device 100' in the tablet position according to an example embodiment. As shown in FIG. 1D, when the portable computing device 100' is in the tablet position, the back side 112 (not labeled in FIG. 1D) of the display portion 102, which is opposite from the front side 110, faces and/or is in contact with the top side 114 (not labeled in FIG. 1C) of the base portion 104, which is opposite from the bottom side 116. The portable computing device 100' may include the hinge 118 that rotatably attaches the display portion 102 and base portion 104 to each other, enabling the rotation of the display portion 102 with respect to the base portion 104. When the portable computing device 100 is in the tablet position, the user may interact with the display 103 (not shown in FIG. 1C) on the front side 110 of the display portion 102, such as by touches and gestures on the display 103.

Figure 1E:
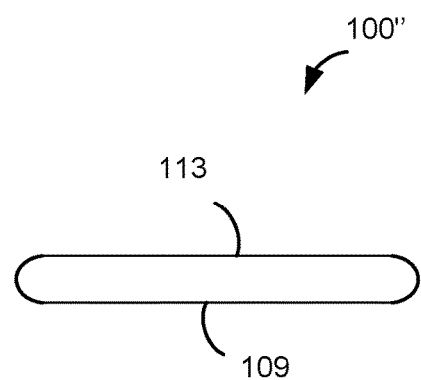

FIG. 1E is a side view of a portable computing device 100" as a tablet computing device according to an example embodiment. As shown in FIG. 1E, the portable computing device 100" includes a housing portion 109 (e.g., enclosure or casing) but does not include a display portion 102 (as shown in FIGS. 1A through 1D), which may contain a display. Instead, the portable computing device 100" includes a display 113 mounted in the housing 109. The display 113 can be a touch screen interface to provide input to the computing device 100".

FIG. 1F is a bottom view of the portable computing device 100 according to an example embodiment. As shown in FIG. 1F, the bottom surface 116 of the base portion 104 may include a textured pattern 120. In an example implementation, the textured pattern 120 can be a plurality of channels (e.g., grooves, ridges, slots, ribs, etc.) that can be regularly spaced apart. In other words, the textured pattern 120 can be corrugated with alternating ridges and grooves (e.g., peaks-and-valleys). To describe in another manner, the textured pattern 120 can include alternating concave ridges 142 and convex channels 144 (shown in FIGS. 1G and 1I). In some implementations, the concave ridges 142 and convex channels 144 can be continuously smooth (e.g., rounded). That is, one set of concave ridge 142 and convex channel 144 can form an S-like shape.

Figure 5A:
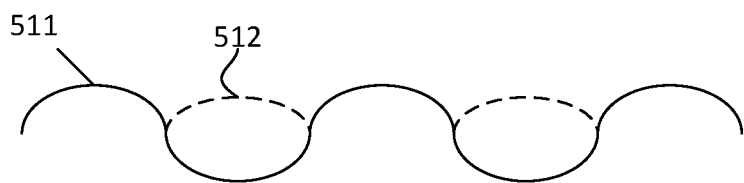
FIGS. 5A through 5G are various views of examples of a portable computing device according to other example implementations.
Figure 5B:
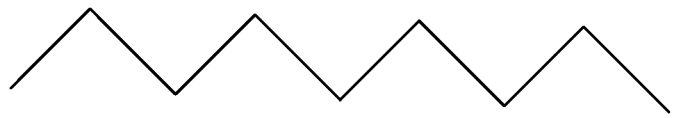
Figure 5C:
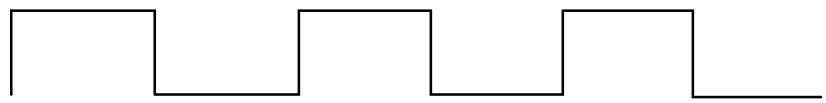
Figure 5D:
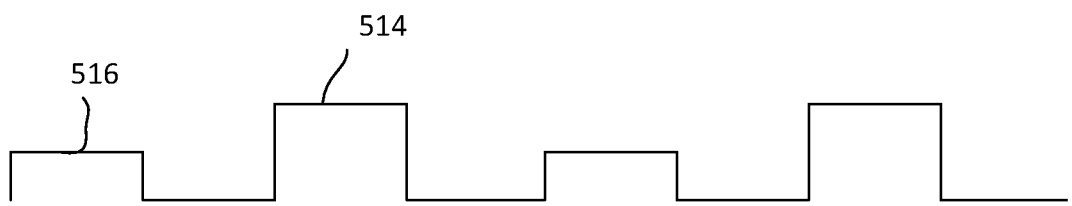
Figure 5E:
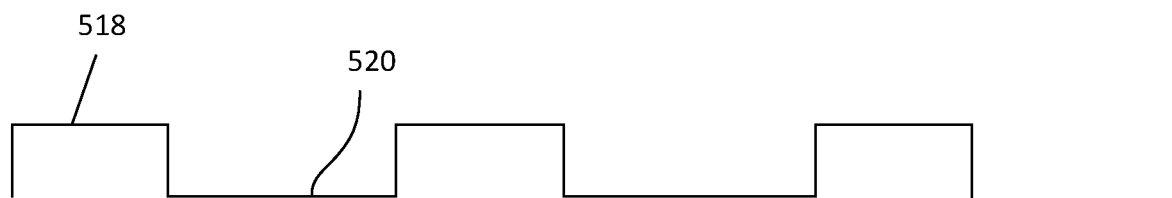
Figure 5F:
Figure 5G:

In some implementations, the bottom surface 116 of the base portion 104 can have other textured patterns. In various implementations, as shown in FIGS. 5A through 5Q the textured pattern 120 may have other shapes and/or sizes. For example, FIG. 5A illustrates the textured pattern having two rows of textured pattern. For example, a second row of textured pattern 512 can be behind a first row of textured pattern 511. In another example, FIGS. 5B-5E illustrate the textured pattern having different surfaces. For example, as shown in FIG. 5B, the surfaces may be a generally triangular shaped concave ridges and convex channels. In another example, as shown in FIG. 5C, the surfaces may be a generally square shaped concave ridges and convex channels. In another example, as shown in FIG. 5D, the surfaces may be a generally square shaped concave ridges and convex channels, in which at least one of the concave ridges 514 may be longer (e.g., extend further) than the other concave ridges 516. In another example, as shown in FIG. 5E, the surfaces may be a generally square shaped concave ridges and convex channels, in which at least one of the convex channels 520 may have a longer width than a width of concave ridge 520. While FIGS. 5B through 5E may illustrate the textured pattern with angles (i.e., right angles), one or more of the surfaces and/or edges can include a curved surface. In another example, FIGS. 5F and 5G illustrate surfaces of the textured pattern can be corrugated. For example, as shown in FIG. 5F, each of the concave ridges and convex channels may be formed by a plurality of surfaces 522. In another example, as shown in FIG. 5Q the surfaces of the concave ridges and convex channels can be non-linear 524 (e.g., curvy, wave-like, etc.). The above described examples are merely general representations of patterns and shapes, and not limited to the ones described herein.

Figure 4A:
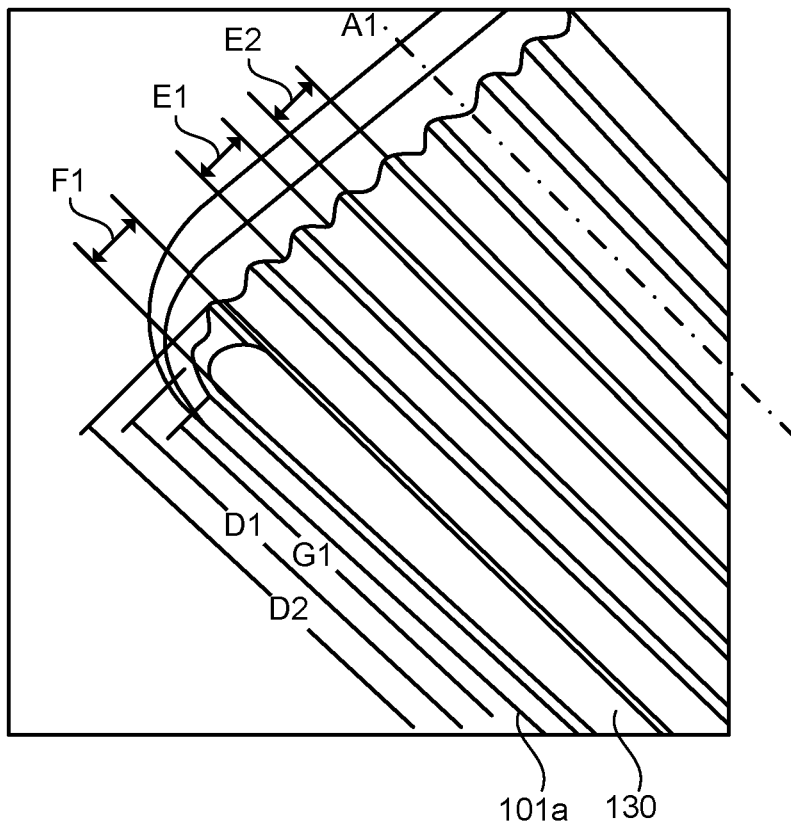
FIGS. 4A and 4B are views of a portion (bottom surface portion) of a portable computing device according to another example implementation.
Figure 4B:
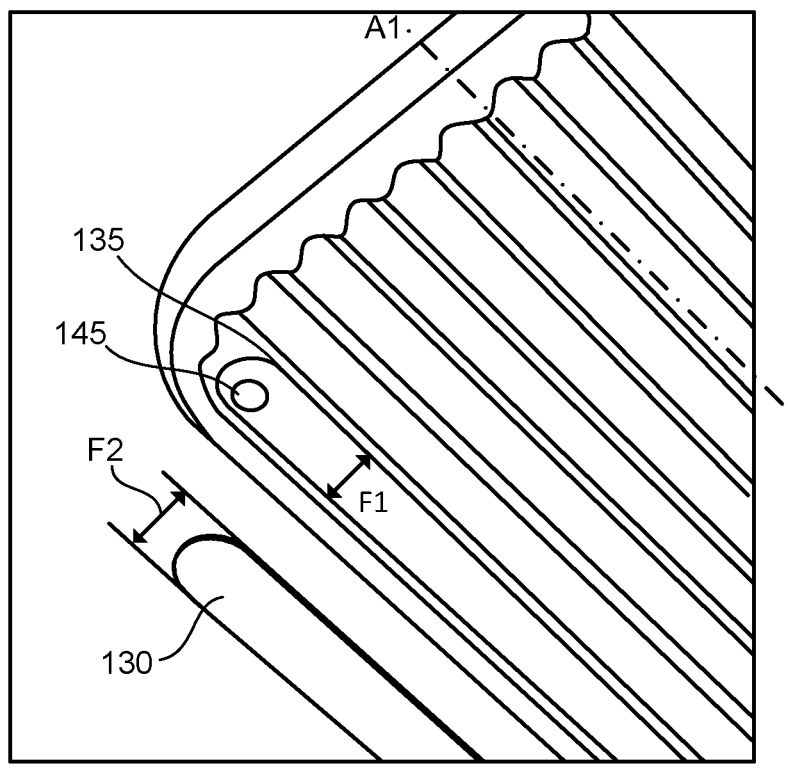
Figure 4C:
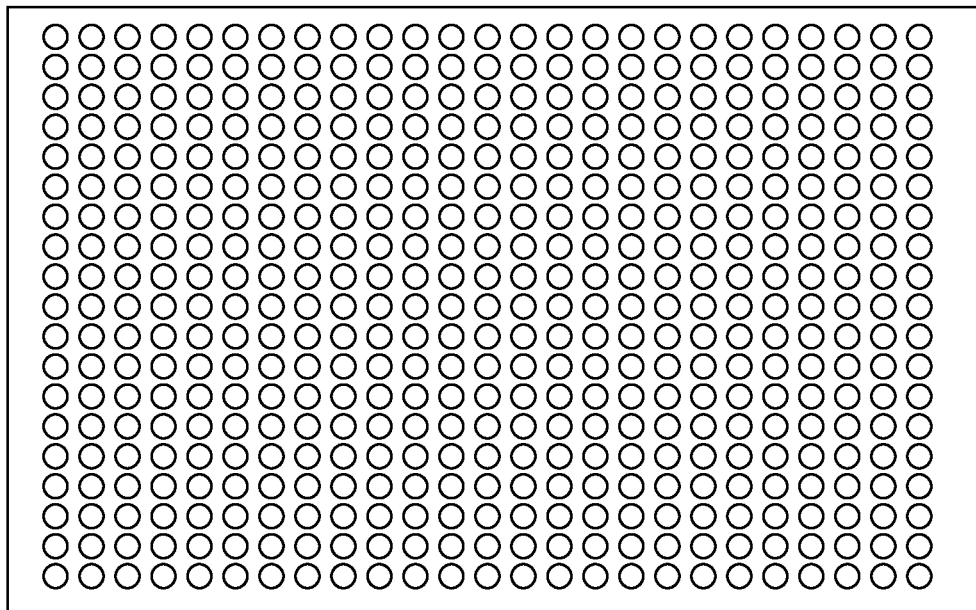
FIG. 4C is a view of a bottom surface portion according to another example implementation.

In some implementations, the textured pattern 120 can be a pattern of circles (as shown in FIG. 4C) at the bottom surface 116 of the base portion 104. In some implementations, the pattern of circles may extend toward an inside (e.g., concave ridges) of the bottom surface 116. In some implementations, the pattern of circles may extend towards an outside (e.g., convex ridges) of the bottom surface 116. In some implementations, the textured pattern 120 can be other shapes, such as, for example, squares, ovals, pentagons, hexagons, heptagons, octagons, other polygons, etc.

According to example implementations, the textured pattern 120 can provide an indication which side of the portable computing device is up (e.g., top side) and which side is down (e.g., bottom side), without having to open the display portion 102. In other words, a user can determine that the surface with the textured pattern 120 indicates a bottom side of the computing device 100, and open the display portion 102 without having to change orientation (e.g., flip) of the computing device 100. In addition to determining proper orientation of the computing device 100, the textured pattern 120 can provide enhanced gripping of the portable computing device 100 in a closed position or an open position. For example, while carrying the portable computing device 100, the textured pattern 120 may provide a gripping surface for ease in carrying the device. In another example, while operating the portable computing device 100 (e.g., on a lap of a user), the textured surface 120 may prevent and/or reduce the portable computing device 100 from falling off the lap of the user. This may be due to a frictional effect caused by the textured pattern 120 on the bottom surface 116 of the portable computing device 100. The textured pattern 120 may also provide structural integrity of the portable computing device 100. For example, the textured pattern 120 can protect components inside of the base portion 104 from damages due to drops, impacts, vibrations and/or compression loads.

As shown in FIG. 1F, the textured pattern 120 may extend from, or between, a first end portion 111 to a second end portion 113 of the base portion 104. In an example described herein, when viewing FIG. 1F, the first end portion 111 may be a left-end portion of the bottom surface 116 of the base portion 104 and the second end portion 113 may be a right-end portion of the bottom surface 116 of the base portion 104. In other words, the textured pattern 120 may extend in a direction along a longitudinal line A1-A1. Hence, the longitudinal line A1-A1 can be defined that extends in a direction along the first end portion 111 to the second end portion 113 of the base portion 104. In some implementations, the textured pattern 120 may alternatively extend from a top end portion 115 to a bottom end portion 117. In other words, the textured pattern 120 may extend in direction orthogonal (e.g., transverse) to the longitudinal line A1-A1. In some implementations, the textured pattern 120 may extend off-angled with respect to the longitudinal line A1-A1. For example, the textured pattern 120 may extend at 45 degrees with respect to the longitudinal line A1-A1.

In some implementations, the textured pattern 120 can be disposed on a substantially entire surface of the bottom surface 116 extending along the same direction as longitudinal line A1-A1, as shown in FIG. 1F. That is, the textured pattern 120 has a repeating pattern until the textured pattern 120 substantially covers the entire surface of the bottom surface 116. In some implementations, the textured pattern 120 can be disposed on only a portion of the bottom surface 116 extending along the same direction as the longitudinal line A1-A1. For example, the textured pattern 120 can be disposed up to a middle portion of the bottom surface 116. As such, the textured pattern 120 can be disposed on only a half portion of the bottom surface 116 and a non-textured pattern (e.g., smooth surface) on the other half portion of the bottom surface 116. In some implementations, the textured pattern 120 alternatively can be disposed up to a mid-portion of the bottom surface 116 extending in an orthogonal (e.g., transverse) direction of the longitudinal line A1-A1. In some implementations, the textured pattern 120 can be disposed only up to a mid-portion of the bottom surface 116 extending in an off-angled (e.g., 45 degrees) direction with respect to the longitudinal line A1-A1.

In some implementations, the textured pattern 120 can be disposed on another surface of the base portion 104. For example, the textured pattern 120 can be disposed on a top surface, opposite the bottom surface 116, of the base portion 104. In some implementations, the textured pattern 120 can be disposed on both surfaces (e.g., top and bottom surfaces) of the base portion 104.

In some implementations, the textured pattern 120 can be disposed on a surface of the display portion 102. For example, the textured pattern 120 can be disposed on an outer top surface of display portion 102. In some implementations, the textured pattern 120 can be disposed on both surfaces of the display portion 102 and the base portion 104.

The base portion 104 can further include a foot pad member 130 on the bottom surface 116 thereof. The foot pad member 130 can be configured to cover at least one fastener 125 (as shown in FIG. 1F). Further details of the fastener 125 with respect to the foot pad member 130 will be described later in this disclosure.

As shown in FIG. 1F, the foot pad member 130 can be located at the top end portion 115 and/or the bottom end portion 117 of the base portion 104. In some implementations, the foot pad member 130 can extend from the first end portion 111 to the second end portion 113 of the base portion 104. In other words, the foot pad member 130 may run in the same direction (e.g., parallel to the textured pattern 120) with respect to the longitudinal line A1-A1. In some implementations, the foot pad member 130 can be made up of several parts that extend along the longitudinal line A1-A1. In other words, the foot pad member 130 can be made up of several members instead of a continuous one-piece member. In some implementations, the foot pad member 130 can be located at only corner(s) of the bottom surface 116 of the base portion 104. For example, the foot pad member 130 can be located at each four corners of the base portion 104. In one example implementation, the foot pad member 130 can be circular in shape. Other shapes, such as, a square, a rectangle, an oval, a polygon, etc. may be employed as a shape of the foot pad member 130.

Figure 1G:
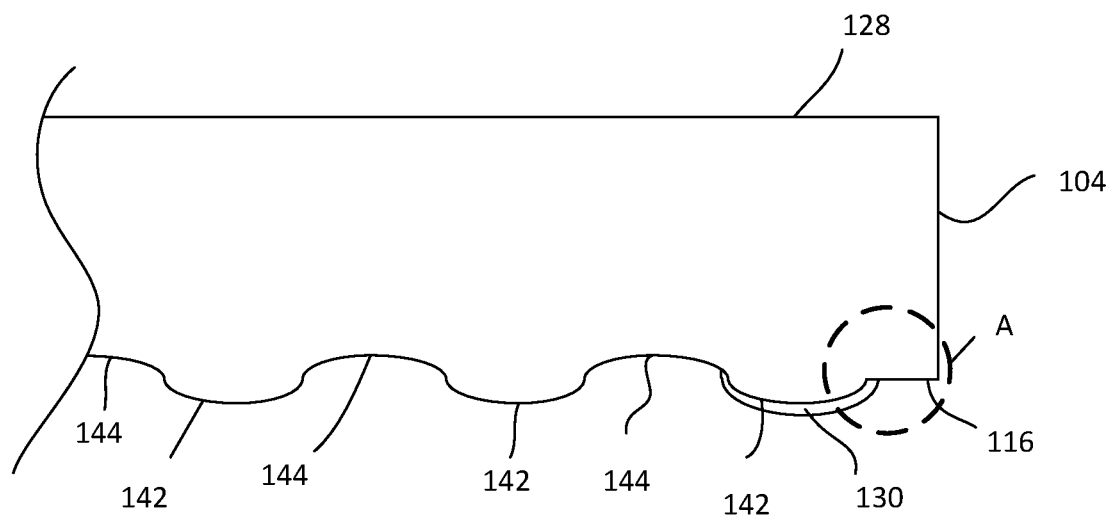

FIG. 1G is a cross-sectional view of a portion of the base portion 104 of FIG. 1F according to an example implementation. As shown in FIG. 1G the foot pad member 130 may be coupled and/or attached to at least one of the concave ridges 142 of the textured pattern 120. For example, the foot pad member 130 may be coupled to one concave ridge 142 that is at the top end portion 115 and/or the bottom end portion 117 of the base portion 104. In some implementations, the foot pad member 130 may be coupled to the concave ridges 142 besides the ones at the top end portion 115 and/or the bottom end portion 117 of the base portion 104. For example, the foot pad member 130 can be coupled to one of the concave ridges 142 on or near a middle portion of the textured pattern 120 in the base portion 104.

Figure 1H:
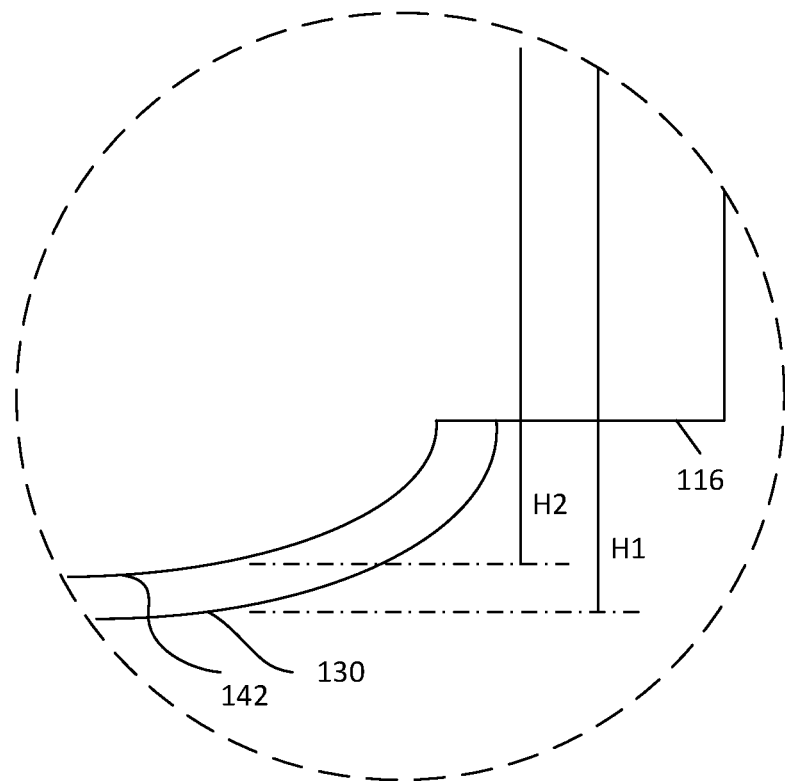

Because the foot pad member 130 can be coupled to the concave ridges 142, the foot pad member 130 extends further away from a surface 128 (e.g., top surface) than the concave ridges 142 that does not include the foot pad member 130. More specifically, referring to FIG. 1H, which is an enlarged view of an area associated with portion A shown in FIG. 1G a distance (e.g., depth) from the surface 128 of the base portion 104 to a bottom surface of the foot pad member 130 represent H1 and a distance (e.g., depth) from the surface 128 of the base portion 104 to a bottom surface of one concave ridge 142 represents H2. In this example implementation, H1 is greater than H2. Hence, the foot pad member 130 extends further away from the surface 128 than the concave ridges 142. In other words, the depth of the foot pad member 130 can be greater than the depth of the concave ridges 142. This can provide the foot pad member 130 to contact a surface of a flat surface, such as, for example, a desk or table, rather than one of the concave ridges 142.

Figure 1I:
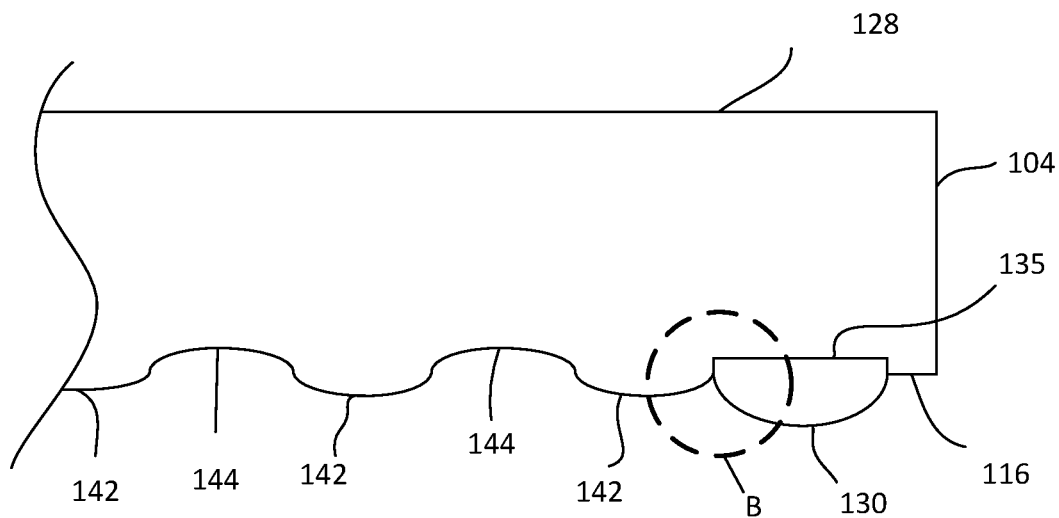

FIG. 1I is a cross-sectional view of a portion of the base portion 104 according to another example implementation. As shown in FIG. 1I, the foot pad member 130 may be disposed inside a recess 135 (e.g., opening, channel, slot, etc.) of the base portion 104. The recess 135 may be configured to receive the foot pad member 130. That is, the recess 135 may have a shape that is similar to a shape of the foot pad member 130. For example, the recess 135 may have a substantially rectangular shape (as shown in FIG. 4B). Referring back to FIG. 1I, the recess 135, as shown in a cross-sectional view, can be a different shape than the textured pattern 120 including the concave ridges 142 and the convex channels 144.

Figure 1J:
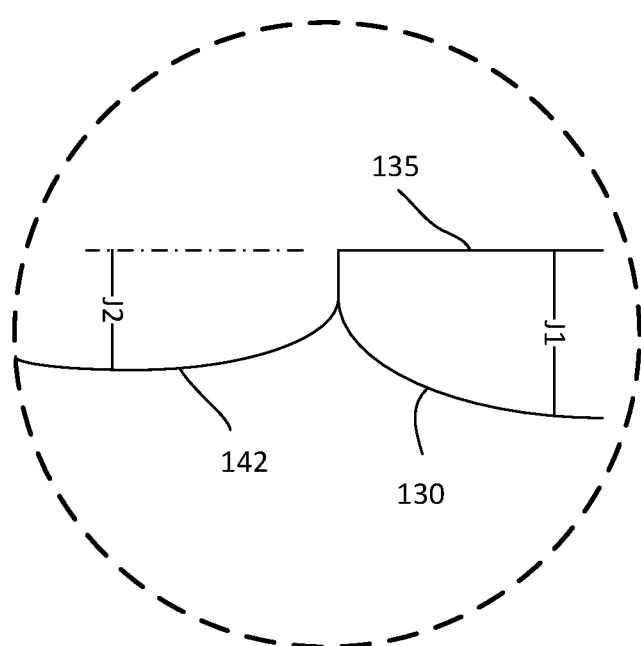

As shown in FIG. 1I, the foot pad member 130 disposed inside of the recess 135 can extend further away from the surface 128 than one of the concave ridges 142. More specifically, referring to FIG. 1J, which is an enlarged view of an area associated with portion B shown in FIG. 1I, a distance (e.g., depth) from a surface of the recess 135 to a bottom surface of the foot pad member 130 represent J1 and a distance (e.g., depth) from the surface of the recess 135 to a bottom surface of one concave ridge 130 represents J2. In this example implementation, J1 is greater than J2. In one example implementation, J1 may have a distance of approximately 1.30 mm and J2 may have a distance of approximately 0.7 mm. Hence, the foot pad member 130 extends further away from the surface of the recess 135 than the concave ridges 142. That is, the depth of the foot pad member 130 can be greater than the depth of the concave ridges 142. This also can provide the foot pad member 130 to contact a surface of a flat surface, such as, for example, a desk or table, rather than one of the concave ridges 142.

In some implementations, a height of each of the concave ridges 142 (e.g., the distance from the surface 128 of the base portion to the bottom surface of each concave ridge 142) can be the same. In some implementations, a height of some of the concave ridges 142 can vary. For example, one concave ridge 142 may have a first height and an adjacent concave ridge 142 may have a second height, different than the first height. This configuration can continue until a pattern is formed.

In some implementations, the foot pad member 130 may be attached and/or bonded to the concave ridge 142 (as shown in FIG. 1G) or the recess 135 (as shown in FIG. 1I) of the base portion 104 with a bonding agent (e.g., adhesive, glue, tape, epoxy resin, etc.).

In some implementations, the foot pad member 130 may be made from a rubber material. The rubber material helps in providing frictional resistance and creating a non-slip surface. Further, rubber materials provide structural integrity and protect the components inside of the portable computing device 100 during impact or when the device is dropped. In some implementations, other materials, such as plastic, may be used to form the foot pad member 130. In some implementations, the foot pad member 130 may have the same material as the base portion 104. In some implementations, the foot pad member 130 may have a different material as the base portion 104.

Figure 2A:
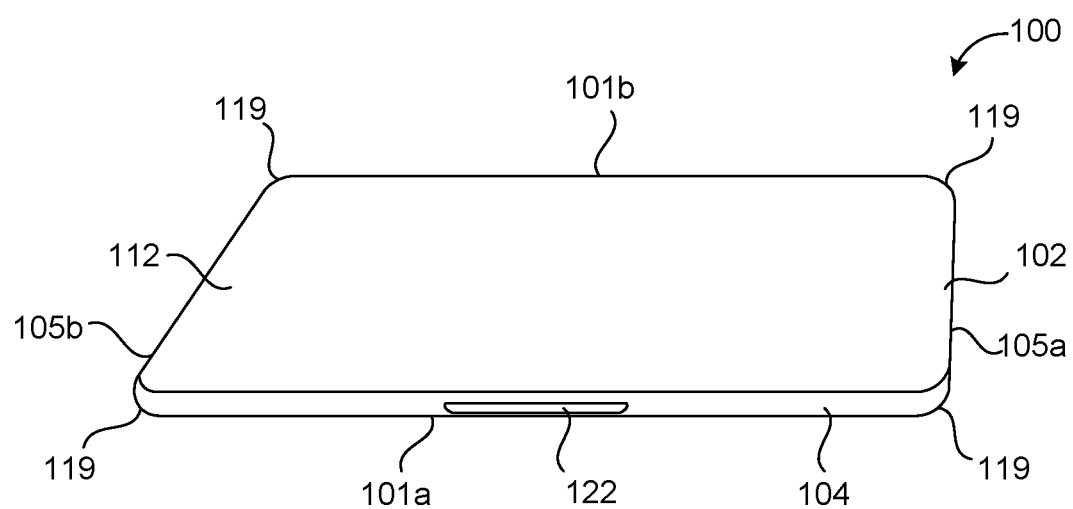
FIGS. 2A through 2H are various views of another example of a portable computing device according to another example implementation.
Figure 2B:
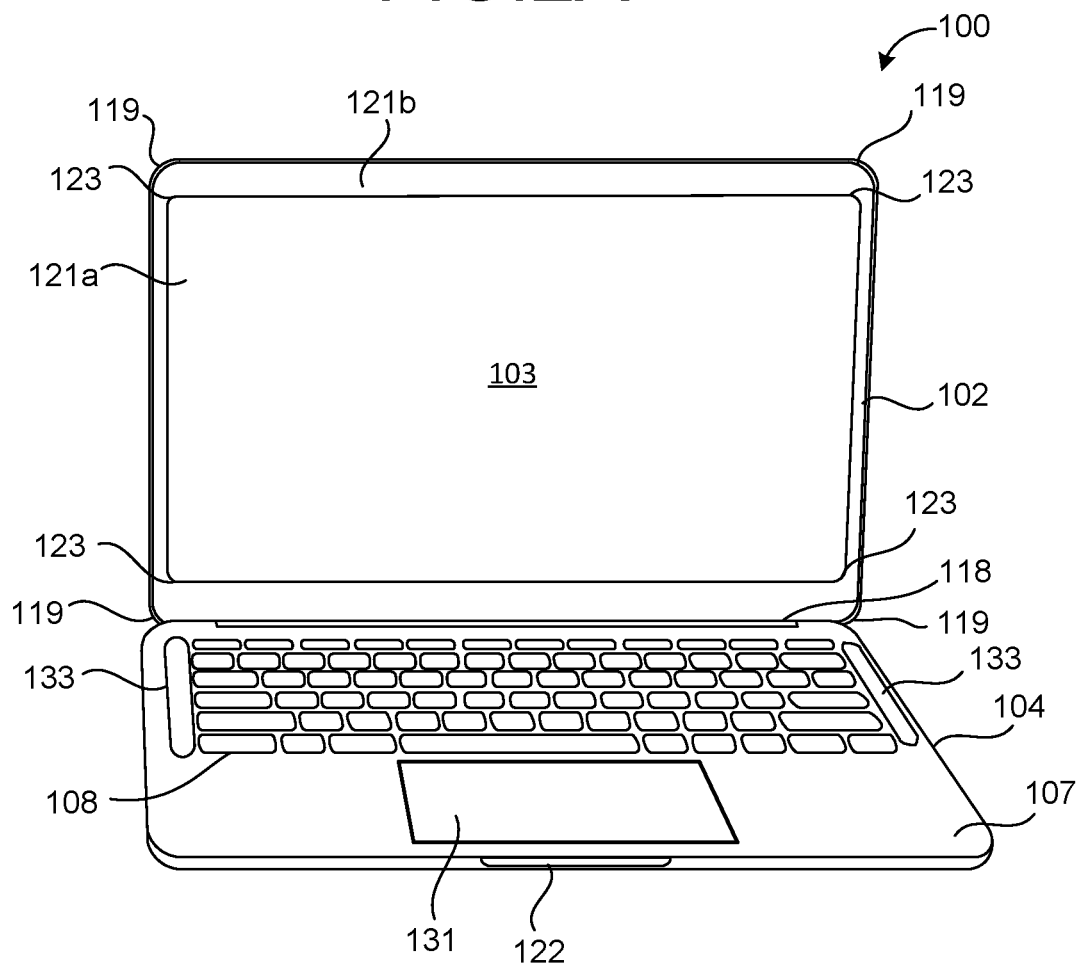
Figure 2C:
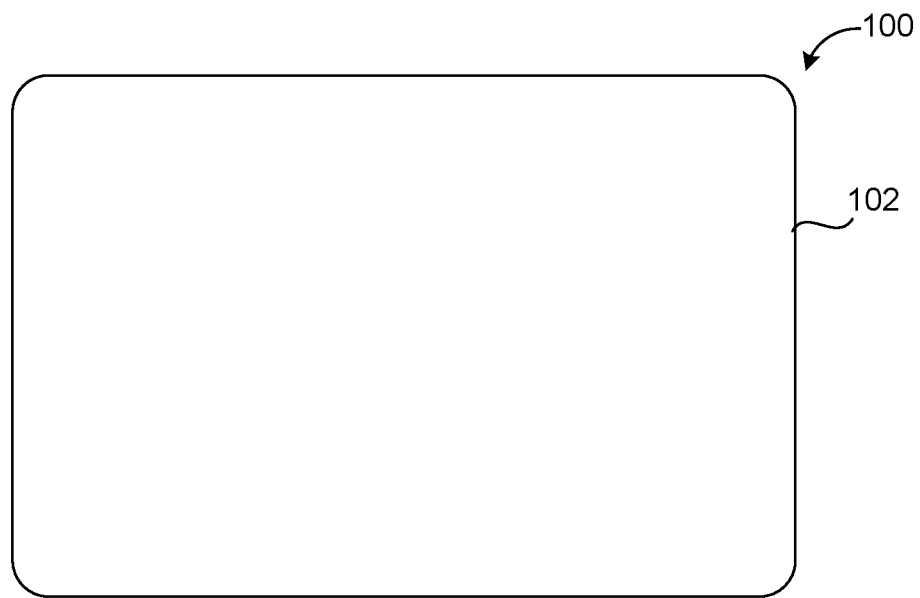
Figure 2D:
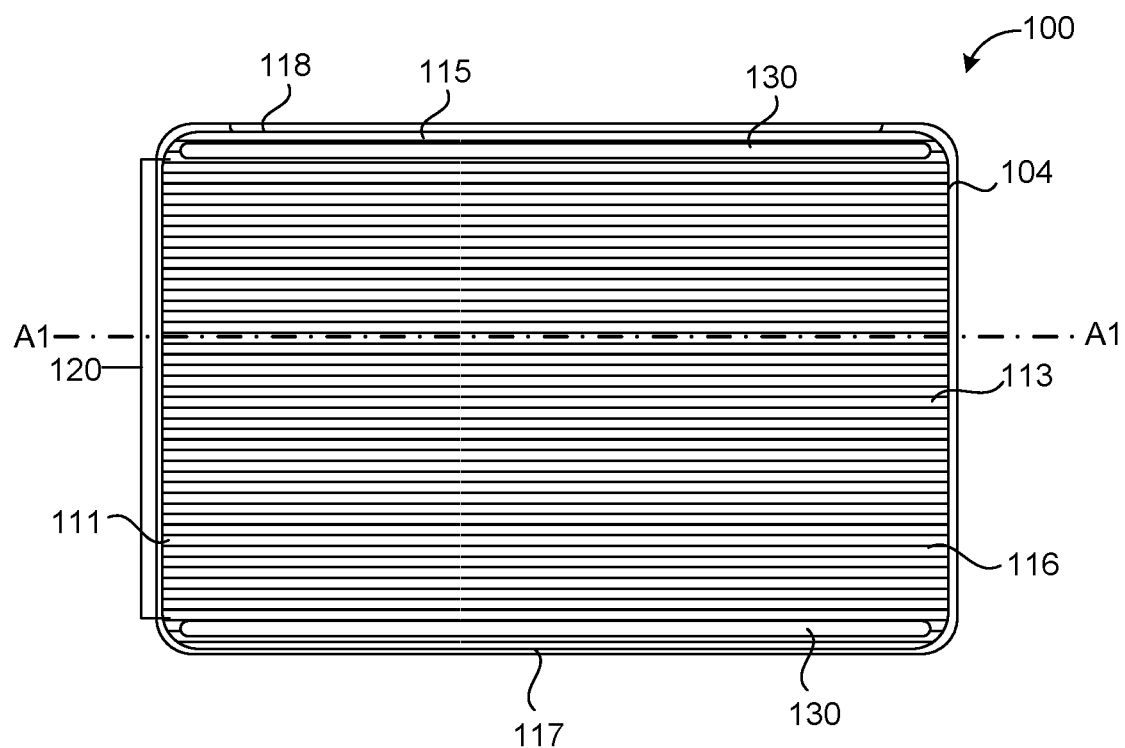
Figure 2E:
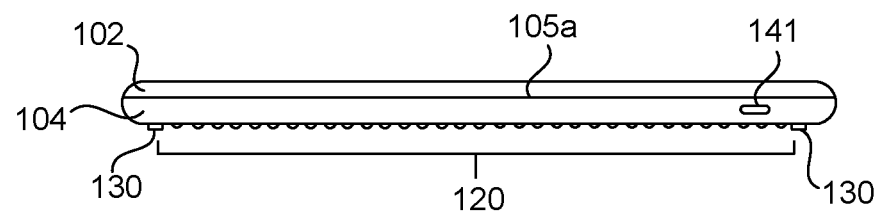
Figure 2F:
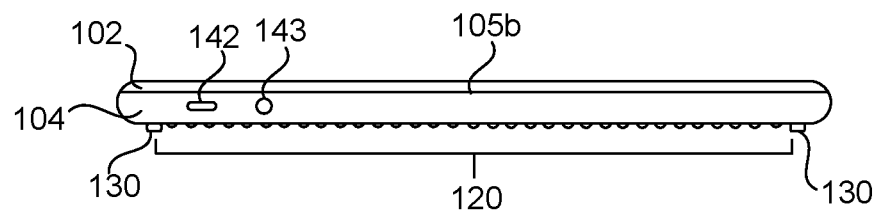
Figure 2G:
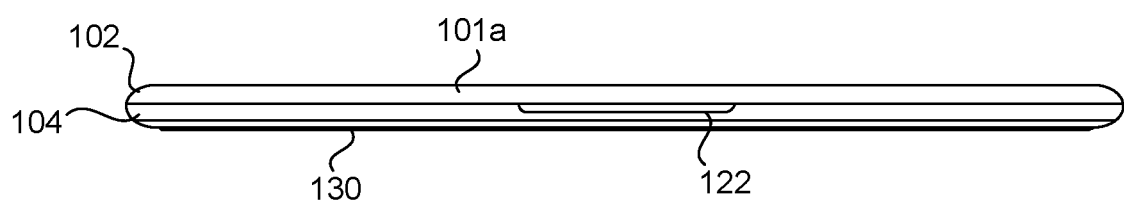
Figure 2H:
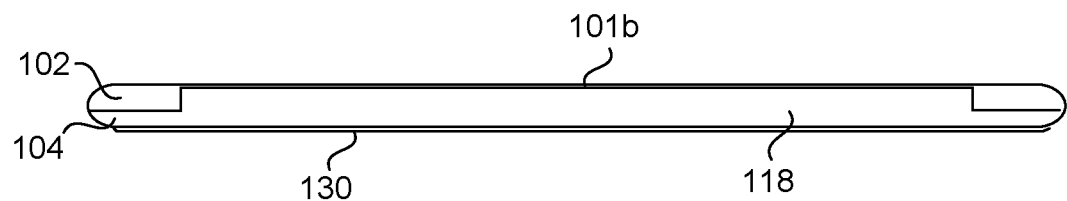

FIGS. 2A through 2H illustrate a computing device 100 according to example implementations. The computing device 100 shown in FIGS. 2A-2H is a variation of the computing device 100 shown in FIGS. 1A through 1C. Like elements will use similar reference numbers. FIG. 2A is a perspective view of the computing device 100 in a closed position; FIG. 2B is a perspective view of the computing device 100 in an open position; FIG. 2C is a top view of the computing device 100 of FIG. 2A; FIG. 2D is a bottom view of the computing device 100 of FIG. 2A; FIG. 2E is a side view, when viewed from a right side of the computing device 100 of FIG. 2A; FIG. 2F is a side view, when viewed from a left side of the computing device 100 of FIG. 2A; FIG. 2G is a side view, when viewed from a front side of the computing device 100 of FIG. 2A; and FIG. 2H is a side view, when viewed from a back side of the computing device 100 of FIG. 2A.

Referring to FIG. 2A, the computing device 100 includes a display portion 102 that is in a closed position with respect to a base portion 104 according to an example implementation. The display portion 102 can include a display 103 (shown in FIG. 2B). In some implementations, the computing device 100 may be generally rectangular shaped having two long sides (e.g., a front side 101a and a back side 101b) and two short sides (e.g., a right side 105a and a left side 105b). The computing device 100 can be other shapes, such as, for example, a square. Further, as shown in at least FIG. 2A, corners 119 of the computing device 100 can be curved (e.g., rounded, smooth, etc.) so as to protect the computing device 100 from damage due to impact when compared to a sharp edge corner. Further, the curved corners 119 can also increase internal volume when compared to a flat surface joining sidewalls at a same joint or edge. Furthermore, the curved corners 119 can provide an aesthetically pleasing look and/or feel to the computing device 100. In some implementations, the corners 119 of the computing device 100 can have a chamfered or beveled edge.

Referring to FIG. 2B, the display portion 102 is in an open position with respect to the base portion 104 according to an example implementation. The display portion 102 may be rotatably attached to the base portion 104 via a hinge 118. The hinge 118 may be located on the back side 101b of the computing device 100, as shown in FIG. 2H. The rotatable attachment of the display portion 102 to the base portion 104, and/or the base portion 104 to the display portion 102, may enable the display portion 102 to rotate to the open position, in which the display portion 102 is not in contact with the base portion 104, and/or in which the display portion 102 is rotated at an angle away from the base portion 104, such as between forty-five degrees (45°) and three hundred fifteen degrees (315°) away from the base portion 104. In addition, the opened position of the display portion 102 can expose a keyboard 108 disposed on the base portion 104. In some implementations, the base portion 104 may include at least a touch-sensitive input device 131 (e.g., touch pad). The input device 131 may be used to track movements of the user's finger on a surface of the input device 131 by detecting the position (e.g., (x,y) coordinates) of the user's finger on the surface of the input device 131 as the user's finger moves across the surface of the input device 131. The computing device 100 may implement gesture recognition software that translates the detected positions of the user's finger into a gesture (e.g., pointer movement, scroll, etc.).

As shown in FIG. 2B, the display portion 102 can include the display 103. The display 103 can include an active area 121a (e.g., display area), in which an array of pixels (not shown) are formed therein, and a non-display area 121b. As illustrated in the exemplary embodiment shown herein, the display 103 may be rectangular shaped. Other shapes may be employed, and not limited to the exemplary embodiment described herein. The non-display area 121b may be provided at a periphery of the display area 121a at each end thereof. That is, the non-display area 121b may surround the display area 121a. In some implementations, corners 123 of the display area 121a can be curved (e.g., rounded, circular, arc, etc.) to provide a conforming contour as the corners 119 of the display portion 102 of the computing device 100. In some implementations, the corners 123 of the display area 121a can have a chamfered or beveled shape. The curved corners 123 of the display area 121a can provide an aesthetically pleasing look to the display portion 102 and/or the entire computing device 100.

In some implementations, the base portion 104 may include a housing 107 (e.g., enclosure, casing, etc.) to house at least one speaker (not shown) inside of the base portion 104. The speaker may be located at least on one side of the base portion 104. In some implementations, the speaker may be located on both short sides of the base portion 104. As shown in FIG. 2B, the housing 107 may further include speaker openings 133 (e.g., holes, cutouts, grill, etc.) on a surface thereof. The speaker openings 133 correspond to a location of the speaker disposed inside of the base portion 104 to allow sound to be delivered to the ambiance from the speaker disposed within the housing 107. In some implementations, the speaker openings 133 may be provided for ventilation purposes. In some implementations, speaker openings 133 may be provided for providing access to internal components inside of the housing 107. In some implementations, the speaker openings 133 can be disposed on at least one short side of the housing 107. For example, as shown in FIG. 2B, the speaker openings 133 can be disposed on both short sides of the housing 107. In some implementations, the speaker openings 133 can have generally a rectangular shape. In some implementations, as shown in FIG. 2B, the speaker openings 133 can have a shape of a capsule "pill" (e.g., a generally rectangular shape with rounded end portions). Other shapes beside the ones described above may be employed for the speaker openings 133.

In some implementations, the base portion 104 may include a groove 122 at a sidewall of the base portion 104. For example, as shown in FIG. 2B, the groove 122 may be disposed at the sidewall of the front side 101a (shown in FIG. 2A) of the base portion 104. The groove 122 may be used as a device to assist in opening the display portion 102. For example, a user may place one finger into the groove 122 and lift the display portion 102 upward to open the display portion 102.

The base portion 104 and/or the display portion 102 may be formed from a metal material. For example, the metal material may be magnesium. Other metal materials, such as, for example, aluminum, may be employed. In some implementations, the base portion 104 and/or the display portion 102 may be formed from a plastic material or some other rugged material, such as various composite polymers, for protecting the subsystem and components disposed within the base portion 104 and display portion 102. In some implementations, both the base portion 104 and the display portion 102 may be formed from the same material. In some implementations, the base portion 104 and the display portion 102 may be formed from different materials.

Referring to FIG. 2D, a bottom surface 116 of the base portion 104 may include a textured pattern 120 according to an example implementation. In some implementations, the textured pattern 120 can include alternating concave ridges and convex channels. As discussed in detail above, the alternating concave ridges and convex channels on the bottom surface 116 of the base portion 104 provide the user to, at least, determine the orientation of the computing device, enhance gripping, and/or provide structural integrity. As shown in FIG. 2D, the textured pattern 120 may extend from a first end portion 111 to a second end portion 113 of the base portion 104 in a direction along the longitudinal line A1-A1. In some implementations, the textured pattern 120 can be disposed on a substantially entire surface of the bottom surface 116.

The base portion 104 may further include a foot pad member 130 at the bottom surface 116 thereof. In some implementations, as shown in FIG. 2D, the foot pad member 130 can be located at a top end portion 115 and/or a bottom end portion 117 of the base portion 104. In some implementations, the foot pad member 130 may run in the same direction (e.g., parallel to the textured pattern 120) with respect to the longitudinal line A1-A1.

Referring to FIG. 2E, which is a side view, when viewed from the right side 105a of the computing device 100 of FIG. 2A, the computing device 100 may include a port 141 configured to connect to external devices, such as, for example, a power cord. In some implementations, port 141 can be configured to access other various I/O interface devices. A type of port 141 may be a USB (universal serial bus) port, for example. In some implementations, port 141 can include a HDMI port, an Ethernet port, a display port, a DVI (digital visual interface) port, a microSD card slot, etc. Other port configurations may be used if desired. The example of FIG. 2E is merely illustrative. In some implementations, port 141 can be disposed in a portion of the base portion 104 of the computing device 100.

Referring to FIG. 2F, which is a side view, when viewed from the left side 105b of the computing device 100 of FIG. 2A, the computing device 100 may include a port 142, similar to port 141 of FIG. 2E, and a headphone jack 143. In some implementations, port 142 and/or the headphone jack 143 can include a USB port, a HDMI port, an Ethernet port, a display port, a DVI (digital visual interface) port, a microSD card slot, etc. Other port configurations may be used if desired. The example of FIG. 2F is merely illustrative. In some implementations, port 142 and the headphone jack 143 can be disposed in a portion of the base portion 104 of the computing device 100.

Referring to FIG. 2G which is a side view, when viewed from the front side 101a of the computing device 100 of FIG. 2A, the computing device 100 may include the groove 122 in the base portion 104 to assist the user to open the display portion 102. In some implementations, the groove 122 can include a shape that is generally rectangular. Other shapes may be employed to form the groove 122.

Referring to FIG. 2H, which is a side view, when viewed from the back side 101b of the computing device 100 of FIG. 2A, the computing device 100 may include the hinge 118 to rotatably open the display portion 102. In other words, the base portion 104 may be rotatably attached to the display portion 102, and/or the display portion 102 may be rotatably attached to the base portion 104 via the hinge 118.

Figure 3A:
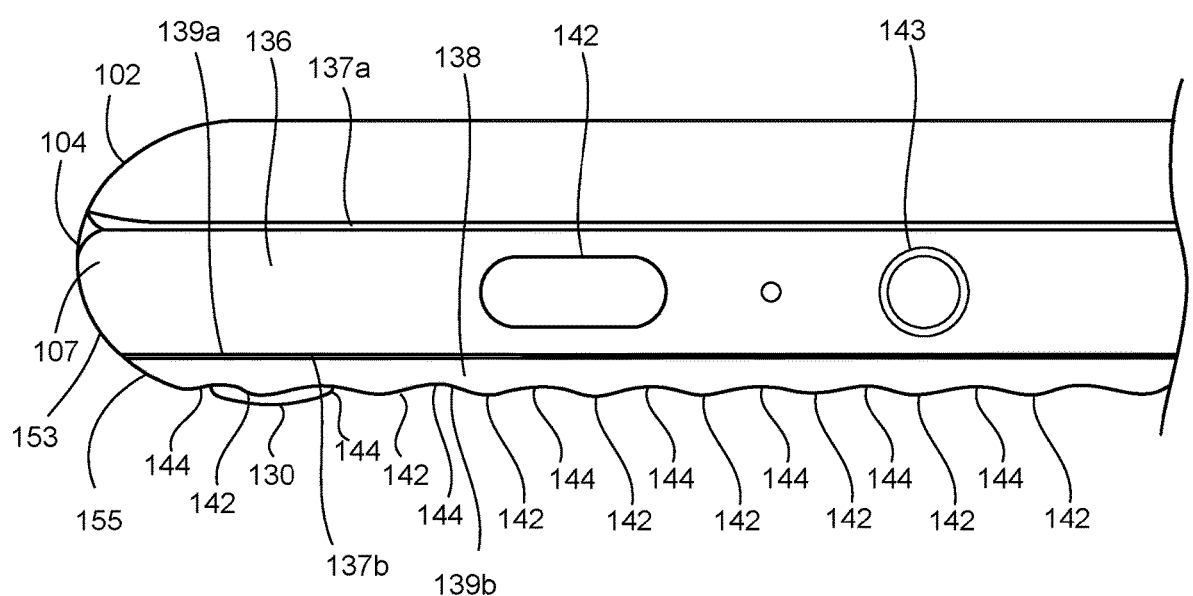
FIG. 3A is a view of a portion of the portable computing device of FIG. 2F.

FIG. 3A is a schematic view of a portion (e.g., left-most end portion) of the computing device 100 of FIG. 2F according to an example implementation. FIG. 3A illustrates the computing device 100 in proper operating configuration, in which a base portion 104 is at a bottom side and a display portion 102 is at a top side. As shown in FIG. 3A, the computing device 100 can include the display portion 102 having a housing to house at least the display 103 (shown in FIG. 2B) and display components, and the base portion 104 having a housing 107 to house and support internally various components (including integrated circuit chips and other circuitry) to provide computing operations for the computing device 100. In some implementations, the integrated circuit chips and other circuitry may include, at least, a microprocessor, memory, a battery, a circuit board, I/O, various input/output (I/O) support circuitry and the like. Although not shown in this figure, the housing 107 may define a cavity within which the components may be positioned and housing 107 also may physically support any suitable number of mechanisms, within housing 107 or within openings through the surface of housing 107.

The base portion 104 can include a first cover portion 136 and a second cover portion 138. The first cover portion 136 can be defined as a structural component of the housing 107 configured for protecting the computing device 102. The first cover portion 136 may be referred to as a C-cover. The first cover portion 136 can include a casing or enclosure (e.g., upper shell housing) configured for protecting the subsystem and components positioned within the base portion 104 of the computing device 100. The second cover portion 138 is a structural component of the base portion 104 for protecting the computing device 100. In addition to providing protection, the second cover portion 138 may further enhance grippable (e.g., no-slip surface) and/or provide structural integrity. The second cover portion 138 may be referred to as a D-cover. The second cover portion 138 may include a casing or enclosure (e.g., lower shell housing) of the base portion 104 for protecting the subsystem and components positioned within the computing device 100. In some implementations, the first and second cover portions 136, 138 may be formed with a metal material, such as, for example, magnesium. Other metal materials may be employed. In some implementations, other non-metal materials or some other material, such as various composite polymers, may be used for protecting the subsystem and components positioned within the base portion 104 of the computing device 100. In some implementations, the first and second cover portions 136, 138 may be formed with different materials.

The first cover portion 136 can include a first surface 137a and a second surface 137b, opposite the first surface 137a. The first surface 137a may be defined as a top surface. When the computing device 100 is in a closed position, the first surface 137a may contact a surface of the display portion 102. The second surface 137b may be defined as a bottom surface. The second surface 137b may be coupled to the second cover portion 138. More specifically, the second surface 137b of the first cover portion 136 may be coupled to a first surface 139a (e.g., a top surface) of the second cover portion 138. In some implementations, the second surface 137b of the first cover portion 136 may be coupled to the top surface 139 of the second cover portion 138 with a fastening device (e.g., a screw, a bolt, a rivet, an anchor, adhesive, glue, tape, etc.).

The second cover portion 138 may further include a second surface 139b (or 116). The second surface 139b may be defined as a bottom surface. As discussed previously in detail, the second surface 139b can include a textured pattern that includes alternating convex ridges 142 and concave ridges 144, as shown in FIG. 3A. The alternating convex ridges 142 and concave ridges 144 are repeated until they substantially cover a substantial portion of the second surface 139b.

The second surface 139b may further include a foot pad member 130 coupled and/or attached to at least one of the concave ridges 142 of the textured pattern 120. For example, as shown in FIG. 3A, the foot pad member 130 may be coupled to the concave ridge 142 that is at the far left-most concave ridge 142. In some implementations, the foot pad member 130 may be coupled to other concave ridges 142 besides the far left-most concave ridge 142. For example, the foot pad member 130 can be coupled to the concave ridge 142 at the far right-most concave ridge 142 (now shown) or other concave ridges, (e.g., at or near a middle portion of the textured pattern 120). Because the foot pad member 130 is coupled to at least one of the concave ridge 142, the foot pad member 130 can extend further away from the first surface 139a (e.g., top surface) of the second cover portion 138. As a result, the foot pad member 130 can contact a surface of a flat surface (e.g., a desk or a table), rather than the concave ridges 142, and protect the second surface 139b of the second cover portion 138.

The first cover portion 136 may include sidewalls. The sidewalls of the first cover portion 136 can be curved (e.g., rounded or smooth) such that the sidewalls form a curved side surface 153. The second cover portion 138 may include sidewalls. Similarly, the sidewalls of the second cover portion 138 can be curved (e.g., rounded or smooth) such that the sidewalls form a curved side surface 155. The curved side surfaces 153 and 155 can be continuous creating a single sidewall. In other words, the curved side surfaces 153 and 155 can be flushed with respect to each other. To describe in another manner, the curved side surfaces 153 and 155 can have a same radius of curvature so that a shape of the base portion 104 appears as a one-piece unit. In some implementations, the curved side surfaces 153 and 155 of the base portion 104 can be continuous with a curved side surface of the display portion 102. This helps define the overall shape and form of the computing device 100 or the contour of the curved side surfaces may embody the outward physical appearance of the computing device 100. For example, the contour of the curved side surfaces of the computing device 100 may provide generally a shape of a capsule pill. Other suitable shapes may be used. In some implementations, the size and shape of the housing 107 may be dimensioned to comfortably operate the computing device 100.

Figure 3B:
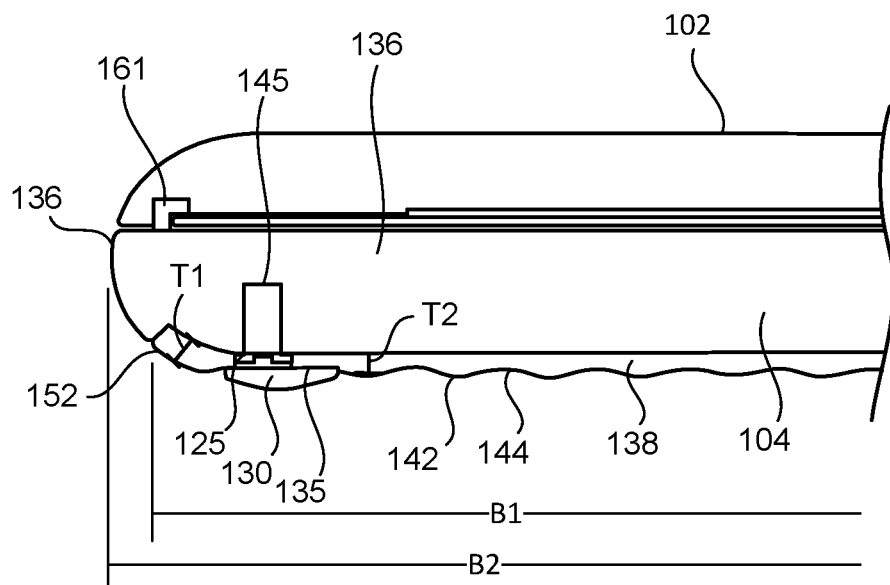
FIGS. 3B and 3C are views of a portion of a portable computing device according to another example implementation.

Further, due to the contour of the curved sidewalls of the first and second cover portions 136 and 138, a length of the first cover portion 136 is different than a length of the second cover portion 138. For example, as shown in FIG. 3B, the first cover portion 136 has a length of B1 and the second cover portion 138 has a length of B2. In this example implementation, B2 is greater than B1.

In some implementations, while FIG. 3B illustrates only one side of the computing device 100, lengths of B1 and B2 can be implemented in all four sides of the computing device 100. In other words, length B2 when compared to length B1 can be greater on the two long sides (e.g., front side 101a and back side 101b) and on the two short sides (e.g., right side 105a and left side 105b).

Figure 3C:
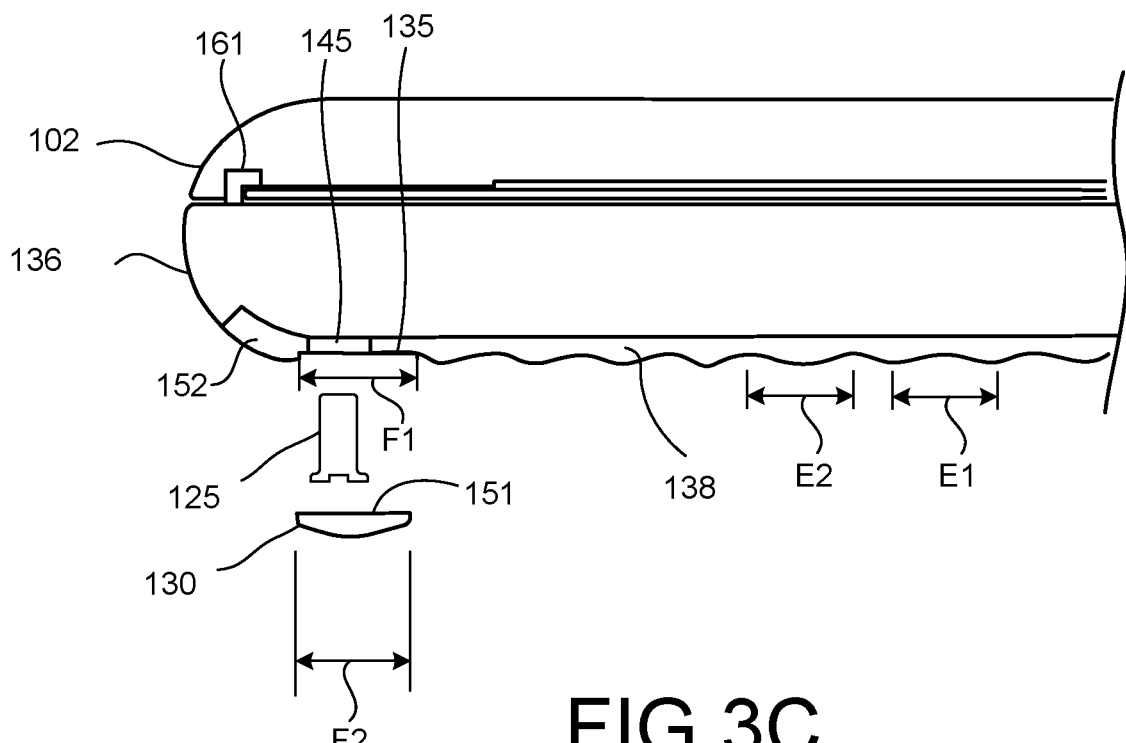

FIGS. 3B and 3C are schematic views of a portion of the computing device 100 of according to another example implementation. The base portion 104 of FIGS. 3B and 3C are similar to the base portion 104 of FIG. 3A except that the foot pad member 130 can be disposed within a recess 135 instead of being on one of the concave ridges 144.

Referring to FIG. 3B, the recess 135 (e.g., opening, channel, slot, etc.) can be configured to receive the foot pad member 130. In some implementations, the recess 135 may have a shape that is similar to a shape of the foot pad member 130. For example, as shown in FIG. 3C, the recess 135 may have a substantially rectangular shape, which may conform to a shape of a top end portion 151 of the foot pad member 130. The shapes of both the foot pad member 130 and the recess 135 should be similarly close such that the foot pad member 130 fits tightly within the recess 135. In an alternative view, FIG. 4B illustrates the recess 135 having a particular shape that corresponds to the shape of the foot pad member 130. In this example implementation, the recess 135 may have a shape of a capsule pill (e.g., a generally rectangular shape with rounded end portions). Other shapes beside the ones described above may be employed, such as, for example, a rectangle, a square, a circle, etc.

Furthermore, the recess 135 can have the same size as the foot pad member 130. For example, as shown in FIGS. 3C and 4B, the recess 135 may have a length F1 and the foot pad member 130 may have a length F2. In this example implementation, lengths F1 and F2 can be substantially the same. In some implementations, the foot pad member 130 and the recess 135 may have different sizes. For example, length F1 of the recess 135 may be larger than length F2 of the foot pad member 130.

The recess 135 may further include a fastener hole 145 for receiving a fastener 125 (e.g., a screw). That is, the fastener hole 145 can be formed inside (e.g., within) the recess 135. The fastener 125 may fasten the second cover portion 138 to the first cover portion 136. In some implementations, the fastener hole 145 may be located near an end portion of the recess 135, as shown in FIG. 4B. In some implementations, the fastener hole 145 may be located at both end portions of the recess 135. In some implementations, the fastener hole 145 may be located at other locations in the recess 135, such as, for example, in a middle portion of the recess 135. In some implementations, there may be more than one fastener hole 145 disposed within the recess 135. In an example implementation, a total of eight fastener holes 145 for receiving corresponding eight fasteners 125 may be disposed within the recess 135. There may be four fastener holes 145 for each recess 135 (e.g., one recess formed near the front side 101a and the other recess 135 formed near the back side 101b). Other number of fastener holes 145 may be disposed within the recess 135.

Because the fastener hole 145 is disposed within the recess 135, the foot pad member 130 covers the fastener 125 and conceals the fastener 125 from view when the foot pad member 130 is disposed within the recess 135. This creates an aesthetic look to the computing device 100. Further, since the fastener 125 is covered by the foot pad member 130, the fastener 125 from getting loose or missing is reduced. Furthermore, the covered foot pad member 130 can prevent and/or reduce exposure to any sharp edges created by the fastener 125.

In addition to the recess 135 being formed on the second cover portion 138, the second cover portion 138 may include the textured pattern 120 (e.g., alternating concave ridges 142 and convex channels 144) at the bottom surface 139b thereof. The alternating concave ridges 142 and convex channels 144 may be disposed substantially across the entire bottom surface 139b extending along the longitudinal line A1-A1, as shown in FIG. 4A. In some implementations, the alternating concave ridges 142 and convex channels 144 may be disposed between two recesses 135. For example, one recess 135 may be formed near the front side 101a and the other recess 135 may be formed near the back side 101b of the computing device 100. Similarly, the foot pad member 130 being disposed near the front side 101a and the back side 101b of the computing device 100.

In some implementations, referring to FIG. 4A, a length of some of the concave ridges 142 and convex channels 144) extending in a direction along the longitudinal line A1-A1 may be different than a length of other concave ridges 142 and convex channels 144. For example, the concave ridges 142 and convex channels 144 near the front side 101a of the computing device 100 (e.g., area where the foot pad member 130 is located) may have a first length D1, and the concave ridges 142 and convex channels 144 away from the front side 101a (e.g., area where the foot pad member 130 is not located) may have a second length D2. In this example implementation, length D1 may be smaller than length D2. This helps in designing and forming the curved sidewalls.

When comparing the lengths D1 and D2 of the concave ridges 142 and convex channels 144, a length G1 of the foot pad member 130 (and the recess 135) can be smaller than lengths D1 and D2. This ensures that the foot pad member 130 does not extend beyond an edge (or sidewalls) of the computing device 100.

In some implementations, a distance between two consecutive concave ridges 142 may be consistent or the same throughout the textured pattern. In other words, the distance may be measured from peak-to-peak of consecutive concave ridges 142. For example, as shown in FIGS. 3C and 4A, two consecutive concave ridges 142 may have a length of E1 and repeated throughout the textured pattern. Hence, the lengths E1 of each consecutive concave ridge 142 may be the same.

In some implementations, a distance between two consecutive concave channels 144 may be consistent or the same throughout the textured pattern. In other words, the distance may be measured from valley-to-valley of consecutive convex channels 144. For example, as shown in FIGS. 3C and 4A, two consecutive concave convex 144 may have a length of E2 and repeated throughout the textured pattern. Hence, the lengths E2 of each consecutive convex channel 144 may be the same.

In some implementations, the length E1 of the concave ridges 142 and the length E2 of the convex channels 144 may be the same. In some implementations, the lengths E1 and E2 may be the different. For example, length E1 may be larger or smaller than length E2.

In some implementations, when comparing lengths E1 and E2 to the length F1 of the recess 135, the lengths E1 and/or E2 can be different with respect to length F1. In an example implementation, as shown in FIGS. 3C and 4B, length F1 can be larger than lengths E1 and/or E2. In some implementations, length F1 can be smaller than lengths E1 and/or E2. In some implementations, length F1 can be the same as lengths E1 and/or E2.

In some implementations, the second cover portion 138 may include an end portion 152, as shown in FIGS. 3B and 3C. The end portion 152 may be configured to interface with a portion of the first cover portion 136. In some implementations, the end portion 152 may be formed at a peripheral edge of the second cover portion 138 to form a portion of the sidewall of the computing device 100.

Because of the contour of the curved sidewalls of the first and second cover portions 136 and 138, a depth T1 (e.g., a distance between the top surface 139a and the bottom surface 139b of the second cover portion) at the end portion 152 may be larger than at other portions of the second cover portion 138. For example, depth T1 may be larger than depth T2, which may be a distance between the top surface 139a to the bottom surface of one of the concave ridge 142. In some implementations, depths T1 and T2 may be the same.

In some implementations, a latch 161 may be formed in the base portion 104 to latch the display portion 102 to the base portion 104 and hold the display portion 102 from opening. In one example implementation, the latch 161 extends upward from the base portion 104 and extends into an interior space of the display portion 102. In some implementations, the latch 161 may be L-shaped.

Figure 6:
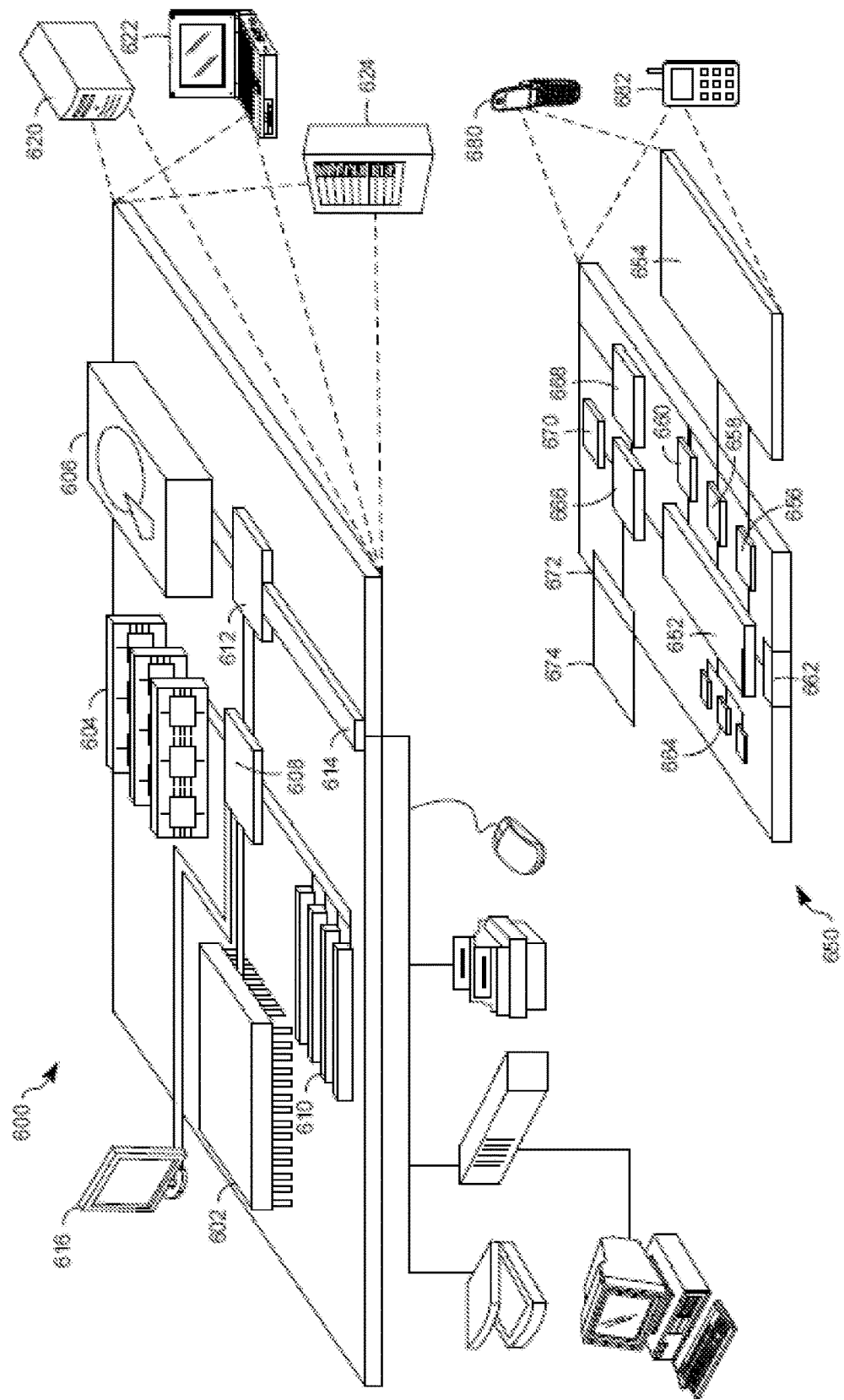
FIG. 6 illustrates an example of a computer device and a mobile computer device that can be used with circuits described here.

FIG. 6 shows an example of a generic computer device 600 and a generic mobile computer device 650, which may be used with the techniques described here. Features described with respect to the computer device 600 and/or mobile computer device 650 may be included in the portable computing device 100 described above. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

The computing device according to example embodiments described herein may be implemented using any appropriate combination of hardware and/or software configured for interfacing with a user including a user device, a user interface (UI) device, a user terminal, a client device, or a customer device. The computing device may be implemented as a portable computing device, such as, for example, a laptop computer. The computing device may be implemented as some other type of portable computing device adapted for interfacing with a user, such as, for example, a PDA, a notebook computer, or a tablet computer. The computing device may be implemented as some other type of computing device adapted for interfacing with a user, such as, for example, a PC. The computing device may be implemented as a portable communication device (e.g., a mobile phone, a smart phone, a wireless cellular phone, etc.) adapted for interfacing with a user and for wireless communication over a network including a mobile communications network.

The computer system (e.g., computing device) may be configured to wirelessly communicate with a network server over a network via a communication link established with the network server using any known wireless communications technologies and protocols including radio frequency (RF), microwave frequency (MWF), and/or infrared frequency (IRF) wireless communications technologies and protocols adapted for communication over the network.

In accordance with aspects of the disclosure, implementations of various techniques described herein may be implemented in digital electronic circuitry, or in computer hardware, firmware, software, or in combinations of them. Implementations may be implemented as a computer program product (e.g., a computer program tangibly embodied in an information carrier, a machine-readable storage device, a computer-readable medium, a tangible computer-readable medium), for processing by, or to control the operation of, data processing apparatus (e.g., a programmable processor, a computer, or multiple computers). In some implementations, a tangible computer-readable storage medium may be configured to store instructions that when executed cause a processor to perform a process. A computer program, such as the computer program(s) described above, may be written in any form of programming language, including compiled or interpreted languages, and may be deployed in any form, including as a stand-alone program or as a module, component, subroutine, or other unit suitable for use in a computing environment. A computer program may be deployed to be processed on one computer or on multiple computers at one site or distributed across multiple sites and interconnected by a communication network.

Specific structural and functional details disclosed herein are merely representative for purposes of describing example embodiments. Example embodiments, however, may be embodied in many alternate forms and should not be construed as limited to only the embodiments set forth herein.

The terminology used herein is for the purpose of describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above," "upper," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein may be interpreted accordingly.

Example embodiments of the present inventive concepts are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the present inventive concepts should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of example embodiments.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present embodiments.

Unless otherwise defined, all terms (including technical and scientific terms) used herein have the same meaning as commonly understood by one of ordinary skill in the art to which this present inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or subcombinations of the functions, components, and/or features of the different implementations described.

What is claimed is:

1. A laptop computing device, comprising:
   a display portion including a display; and
   a base portion rotatably attached to the display portion, the base portion including:
   a first cover portion;
   at least one fastener;
   a second cover portion attached to the first cover portion by the at least one fastener, the second cover portion including a textured pattern on a surface of the second cover portion, the textured pattern extending in a direction along a longitudinal line, the textured pattern including alternating concave ridges and convex channels; and
   at least one foot pad member disposed on at least one concave ridge of the textured pattern, the at least one foot pad member extending in the direction along the longitudinal line, the at least one foot pad member being configured to cover at least a portion of the at least one fastener.

2. The laptop computing device of claim 1, wherein the base portion includes a first edge portion extending in the direction along the longitudinal line and a second edge portion, opposite the first edge portion, extending in the direction along the longitudinal line, the at least one foot pad member is disposed along at least one of the first edge portion or the second edge portion.

3. The laptop computing device of claim 2, wherein the at least one foot pad member includes a first foot pad member disposed at the first edge portion and a second foot pad member disposed at the second edge portion.

4. The laptop computing device of claim 1, further comprising a recess on the surface of the second cover portion, the recess being configured to receive the at least one foot pad member.

5. The laptop computing device of claim 4, wherein the recess has a first shape and the at least one foot pad member has a second shape, the second shape being the same as the first shape.

6. The laptop computing device of claim 4, wherein the at least one fastener is disposed within the recess.

7. The laptop computing device of claim 4, wherein the recess extends in the direction along in the longitudinal line.

8. The laptop computing device of claim 1, wherein each concave ridge of the textured pattern has a same height with respect to each other.

9. The laptop computing device of claim 1, wherein at least one concave ridge of the textured pattern has a different height with respect to other concave ridges.

10. The laptop computing device of claim 1, wherein the second cover portion includes a first surface and a second surface, opposite the first surface, the first surface being closer to the first cover portion, the at least one foot pad member is located further away from the first surface of the second cover portion than at least one concave ridge of the textured pattern.

11. A portable computing device, comprising:
    a display;
    a first cover portion having a first curved sidewall portion; and
    a second cover portion having a second curved sidewall portion, the second curved sidewall portion being aligned with the first curved sidewall portion to form a continuous sidewall, the second cover portion including a textured pattern on a surface of the second cover portion, the textured pattern including alternating concave ridges and convex channels, the at least one of the concave ridge or the convex channel forms the sidewall.

12. The device of claim 11, wherein the textured pattern extends in a direction along a longitudinal line.

13. The device of claim 11, further comprising at least one foot pad member coupled to the surface of the second cover portion, the at least one foot pad member extends in a direction along a longitudinal line.

14. The device of claim 11, wherein the first curved sidewall portion has a first radius of curvature, the second curved sidewall portion has a second radius of curvature, the second radius of curvature being the same as the first radius of curvature.

15. The device of claim 11, wherein the first cover portion has a first length extending in a direction along a longitudinal line and the second cover portion has a second length extending in the direction along the longitudinal line, the second length being smaller than the first length.

16. The device of claim 11, wherein the first cover portion has a third length extending in a direction orthogonally along the longitudinal line and the second cover portion has a fourth length extending in the direction orthogonally along the longitudinal line, the fourth length being smaller than the third length.

* * * * *